United States Patent
Fukushima et al.

(10) Patent No.: US 11,061,229 B2
(45) Date of Patent: Jul. 13, 2021

(54) HEAD-UP DISPLAY

(71) Applicant: NIPPON SEIKI CO., LTD., Niigata (JP)

(72) Inventors: Yuichi Fukushima, Niigata (JP); Yasuhiro Yamakawa, Niigata (JP); Kiyoshi Tsuchida, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 16/649,575

(22) PCT Filed: Sep. 25, 2018

(86) PCT No.: PCT/JP2018/035408
§ 371 (c)(1),
(2) Date: Mar. 20, 2020

(87) PCT Pub. No.: WO2019/065613
PCT Pub. Date: Apr. 4, 2019

(65) Prior Publication Data
US 2020/0285054 A1   Sep. 10, 2020

(30) Foreign Application Priority Data

Sep. 27, 2017   (JP) .............................. JP2017-186079

(51) Int. Cl.
*G02B 27/01* (2006.01)
*B60K 35/00* (2006.01)
*H04N 9/31* (2006.01)

(52) U.S. Cl.
CPC .......... *G02B 27/0149* (2013.01); *B60K 35/00* (2013.01); *G02B 27/0101* (2013.01); *H04N 9/3144* (2013.01); *B60K 2370/1529* (2019.05)

(58) Field of Classification Search
CPC   B60K 35/00; B60K 2370/1529; G02B 27/01; G02B 27/0101; G02B 27/0149;
(Continued)

(56) References Cited

U.S. PATENT DOCUMENTS 3,577,137 A  *  5/1971  Brennan, Jr.  ............. B41J 2/36
                                                         347/194
2010/0073912 A1     3/2010  Shinozaki et al.
(Continued)

FOREIGN PATENT DOCUMENTS

JP     2005-024774 A     1/2005
JP     2005-181915 A     7/2005
(Continued)

OTHER PUBLICATIONS

International Search Report issued in corresponding International Patent Application No. PCT/JP2018/035408, dated Dec. 25, 2018, with English translation.

*Primary Examiner* — Christopher E Leiby
(74) *Attorney, Agent, or Firm* — McDermott Will & Emery LLP (57) ABSTRACT

Provided is a head-up display in which the characteristics for dissipating heat generated by a light source are excellent. This head-up display emits display light of a display image projected by a display device to a transmission/reflection part of the vehicle to allow a viewer to see a virtual image of the display image. The display device comprises: a substrate that has a quadrilateral heat dissipation plate having corners; and a quadrilateral light source that is provided on the heat dissipation plate, and that has corners. The heat dissipation plate is disposed such that the corners of the heat dissipation plate 61 are rotated relative to the corners of the light source.

7 Claims, 6 Drawing Sheets

(58) Field of Classification Search
CPC .............. G02B 26/008; G02B 19/0023; G02B 19/0057; G02B 7/1825; G02B 7/006; H04N 5/64; H04N 9/3161; H04N 9/3147; G03B 21/204
See application file for complete search history.

(56) References Cited

U.S. PATENT DOCUMENTS

| | | | |
|---|---|---|---|
| 2014/0293431 A1* | 10/2014 | Ishimoto | .............. H04N 9/3129 359/630 |
| 2015/0085197 A1 | 3/2015 | Yoshida | |
| 2017/0329181 A1* | 11/2017 | Pierre | ................ G02B 19/0066 |
| 2018/0136548 A1 | 5/2018 | Koiida et al. | |
| 2020/0240717 A1* | 7/2020 | Karlstedt | ............ F28D 15/0266 |

FOREIGN PATENT DOCUMENTS

| | | | |
|---|---|---|---|
| JP | 2015-065391 A | 4/2015 | |
| JP | 2016-218259 A | 12/2016 | |
| WO | 2008/132941 A1 | 11/2008 | |

\* cited by examiner

HEAD-UP DISPLAY

CROSS REFERENCE

This application is the U.S. National Phase under 35 U.S.C. § 371 of International Application No. PCT/JP2018/035408, filed on Sep. 25, 2018, which claims the benefit of Japanese Application No. 2017-186079, filed on Sep. 27, 2017, the entire contents of each are hereby incorporated by reference.

TECHNICAL FIELD

The present disclosure relates to a head-up display mounted on a vehicle or the like.

BACKGROUND ART

A head-up display is mounted on a vehicle and displays a virtual image of various information such as information necessary for driving, to a driver via a transmission reflection part such as a front glass. This allows the head-up display to display information (image), superimposing same on the scene in front of the vehicle. The driver can grasp necessary information without having to move a large line of sight while driving.

The image is generated by, for example, a projection type display device. This projection type display device includes a substrate on which a light source is mounted. Since the light source is a heating element, various heat radiation measures have been taken for the substrate and a housing (for example, see Patent Document 1).

PRIOR ART DOCUMENT

Patent Document

Patent Document 1: Japanese Unexamined Patent Application Publication No. 2016-218259

SUMMARY OF THE INVENTION

Problems to be Solved by the Invention

Today, light sources are required to have high brightness in order to enhance the visibility of displayed images. Consequently, the amount of heat generated by the light sources is increasing, and further heat radiation measures are required.

The present disclosure has been made in view of such circumstances, and it is an object of the present disclosure to provide a head-up display having excellent heat radiation performance for heat generated by a light source.

Solution to Problem

In order to solve the above-mentioned problem, the head-up display according to the present disclosure is a head-up display for irradiating display light of a display image projected by a display device to a transmission reflection part on a vehicle to allow a viewer to visually recognize a virtual image of the display image, and the display device includes a circuit substrate including a heat dissipation plate in an inner layer and a light source provided on the heat dissipation plate.

Effect of the Invention

The head-up display according to the present disclosure has excellent heat radiation performance for heat generated by a light source.

MODE FOR CARRYING OUT THE INVENTION

An embodiment of the head-up display according to the present disclosure will be described with reference to the accompanying drawings. The head-up display according to the present disclosure is mounted on a vehicle such as an automobile, for example. In this embodiment, this is explained with the use of an example in which the head-up display according to the present disclosure is mounted on an automobile.

Figure 1:
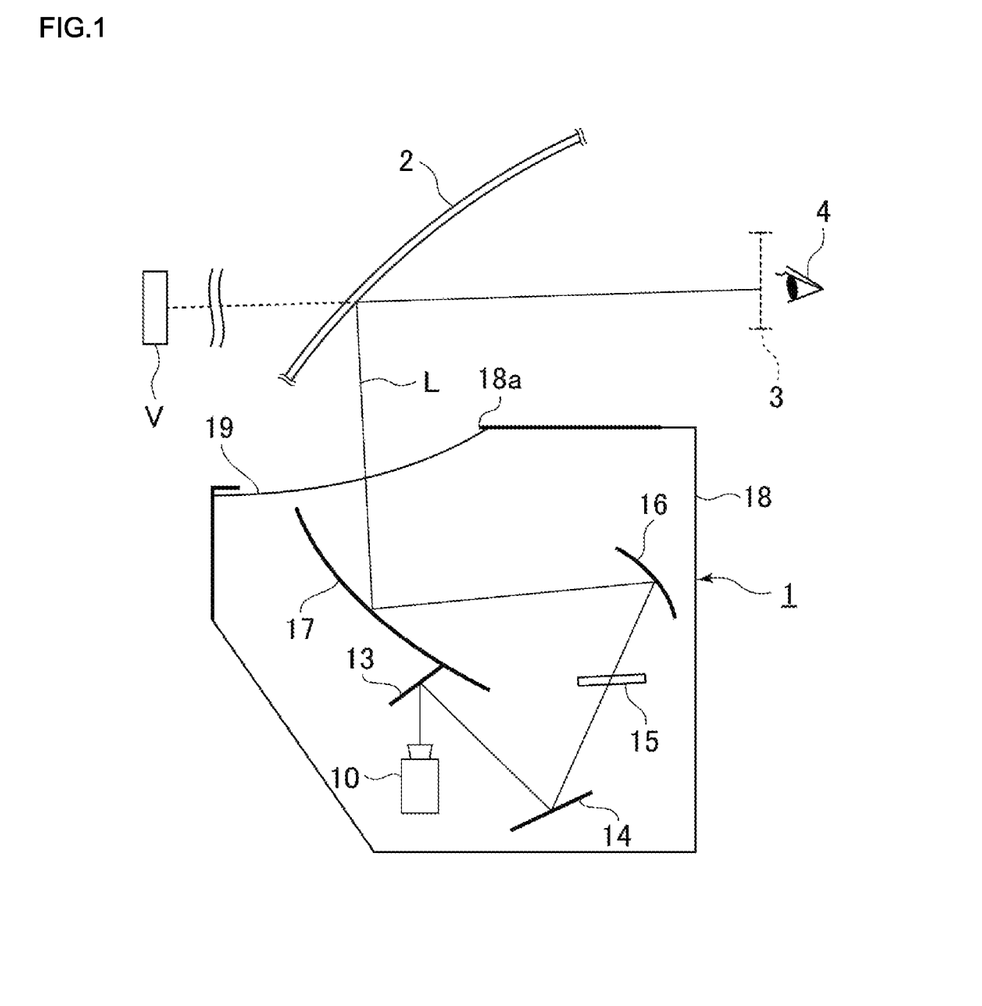
FIG. 1 is an embodiment of a head-up display according to the present disclosure, and is an explanatory diagram particularly illustrating a configuration of an optical system.

FIG. 1 is an embodiment of the head-up display according to the present disclosure, and is an explanatory diagram particularly illustrating a configuration of an optical system.

A head-up display 1 (hereinafter, referred to as a HUD 1) is arranged in the instrument panel of an automobile. The HUD 1 mainly includes a projection type display device 10, a first plane mirror 13, a second plane mirror 14, a screen 15, a first concave mirror 16, a second concave mirror 17, and a case 18. The HUD 1 reflects display light L representing a display image displayed by the projection type display device 10 by the first and second plane mirrors 13 and 14 and the first and second concave mirrors 16 and 17, which constitute a relay optical system, and irradiates the display light L to a front glass 2 of the automobile, which is an example of the transmission reflection part. A viewer (mainly the driver) can place a viewpoint 4 in an eyebox 3 which is an image visible area generated by the HUD 1, thereby superimposing the viewpoint 4 on a scene (real view) in front of the vehicle to visually recognize a virtual image V of a display image.

The projection type display device 10 (display device 10) generates display light L related to the display image. The details of the display device 10 will be described later. The first plane mirror 13 reflects the display light L generated and emitted by the display device 10. The second plane mirror 14 further reflects the display light L reflected by the first plane mirror 13. The screen 15 receives the display light L reflected by the second plane mirror 14 and displays an image (real image). The first concave mirror 16 reflects the display light L emitted from the screen 15. The second concave mirror 17 reflects the display light L reflected by the first concave mirror 16 toward the front glass 2. The case 18 houses the display device 10, first and second plane mirrors 13 and 14, screen 15, and first and second concave mirrors 16 and 17. The case 18 has an opening 18a at a portion facing the front glass 2. The opening 18a is covered with a translucent cover 19 having translucency. The display light L reflected by the second concave mirror 17 is transmitted through the translucent cover 19 and emitted from the HUD 1.

Figure 2:
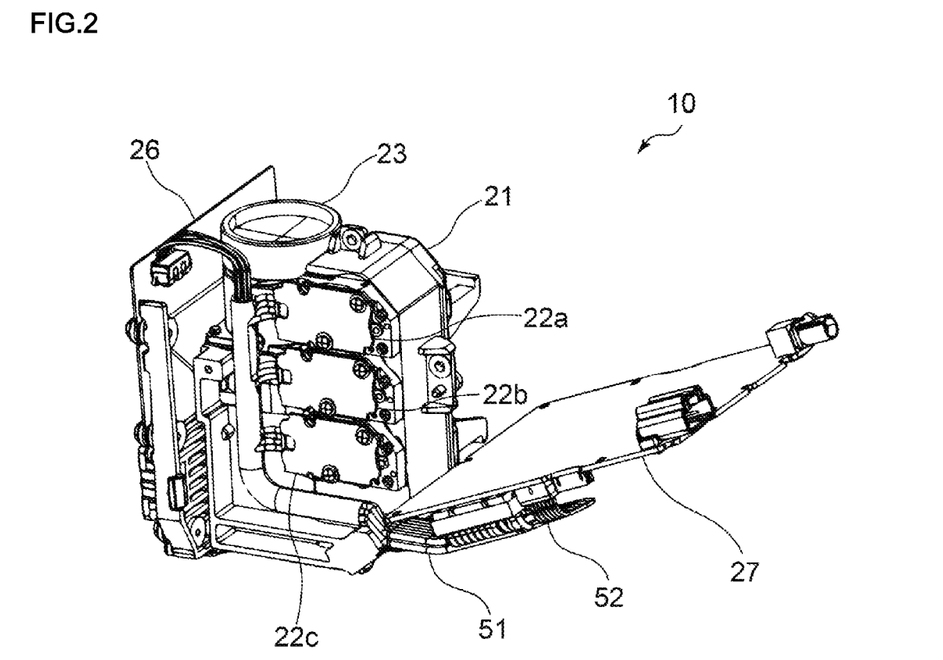
FIG. 2 is a configuration diagram of a projection type display device.

FIG. 2 is a configuration diagram of the display device 10.

Figure 3:
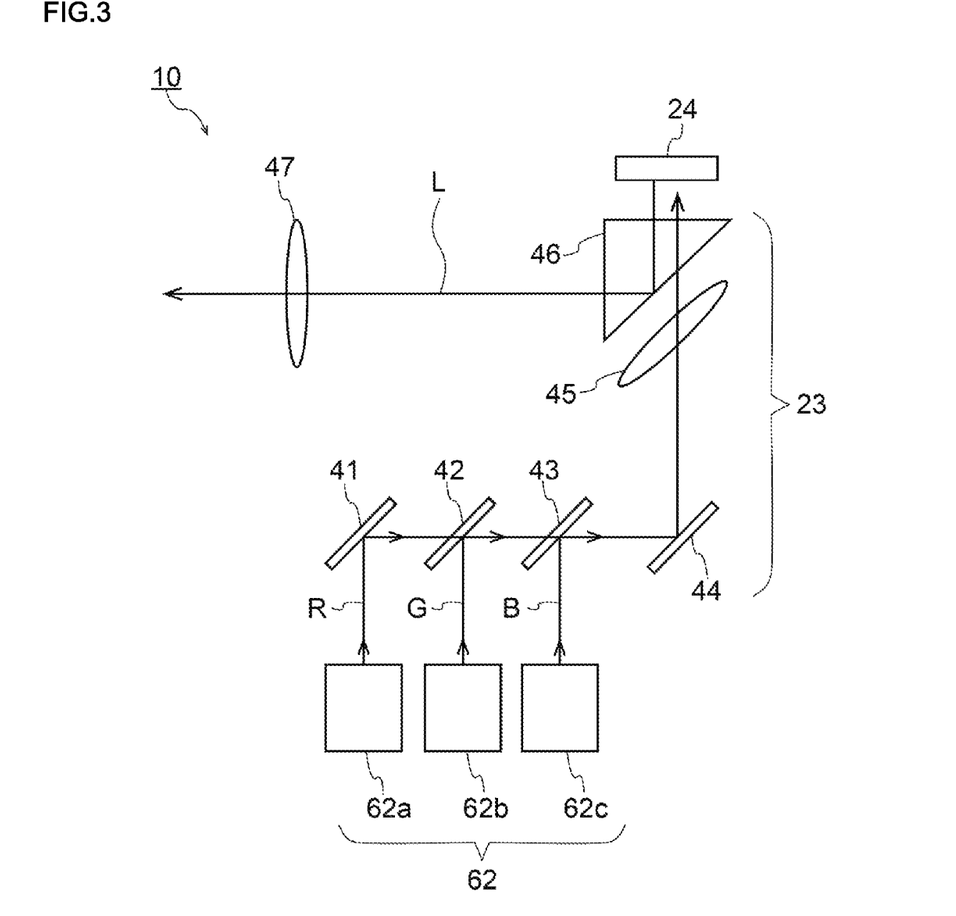
FIG. 3 is an explanatory diagram illustrating a configuration of an optical system of the projection type display device.

FIG. 3 is an explanatory diagram illustrating the configuration of the optical system of the display device 10.

The projection type display device 10 includes a housing 21, an LED substrate 22, an optical member 23, a light modulation element 24, a light modulation element control substrate 26, and a main control substrate 27.

The housing 21 houses the optical member 23. The housing 21 has a structure for attaching the light modulation element 24 and each of the substrates 22, 26, and 27. In particular, the housing 21 includes a plurality of misassembly prevention protrusions 31a, 31b, and 31c (housing-side attachment parts) (see FIG. 5) for attaching the LED substrate 22.

The LED (Light Emitting Diode) substrate 22 includes a first substrate 22a, a second substrate 22b, and a third substrate 22c, and different light sources are mounted. In the first substrate 22a, a red light source 62a that emits a red light ray R is implemented. In the second substrate 22b, a green light source 62b that emits a green light ray G is implemented. In the third substrate 22c, a blue light source 62c that emits a blue light ray B is implemented. In the following description, when the first to third substrates 22a, 22b, and 22c are not distinguished, they are simply referred to as the LED substrate 22. In addition, when the red light source 62a, green light source 62b, and blue light source 62c are not distinguished, they are simply referred to as a light source 62. The details of the LED substrate 22 will be described later.

As illustrated in FIG. 3, the optical member 23 includes a mirror 41, dichroic mirrors 42 and 43, a reflecting mirror 44, a convex lens 45, a prism 46, and a projection lens 47.

The red light ray R emitted from the red light source 62a is reflected by the mirror 41 and transmitted through the dichroic mirrors 42 and 43. The green light ray G emitted from the green light source 62b is reflected by the dichroic mirror 42 and transmitted through the dichroic mirror 43. The blue light ray B emitted from the blue light source 62c is reflected by the dichroic mirror 43. These rays R, G, and B are reflected by the reflecting mirror 44, distributed by the convex lens 45, and transmitted through the prism 46. The transmitted light rays R, G, and B are converted into the display light L by the light modulation element 24. The display light L is reflected by the prism 46, transmitted through the projection lens 47, and projected (emitted).

The light modulation element 24 is, for example, a reflective display element such as a DMD (Digital Mirror Device) or an LCOS (Liquid Crystal On Silicon).

The light modulation element control substrate 26 is connected to the light modulation element 24 and controls the light modulation element 24.

The main control substrate 27 is connected to the LED substrate 22 by a wiring 51 and controls the LED substrate 22. In addition, the main control substrate 27 is connected to the light modulation element control substrate 26 by a wiring 52 and controls the light modulation element control substrate 26.

Figure 4:
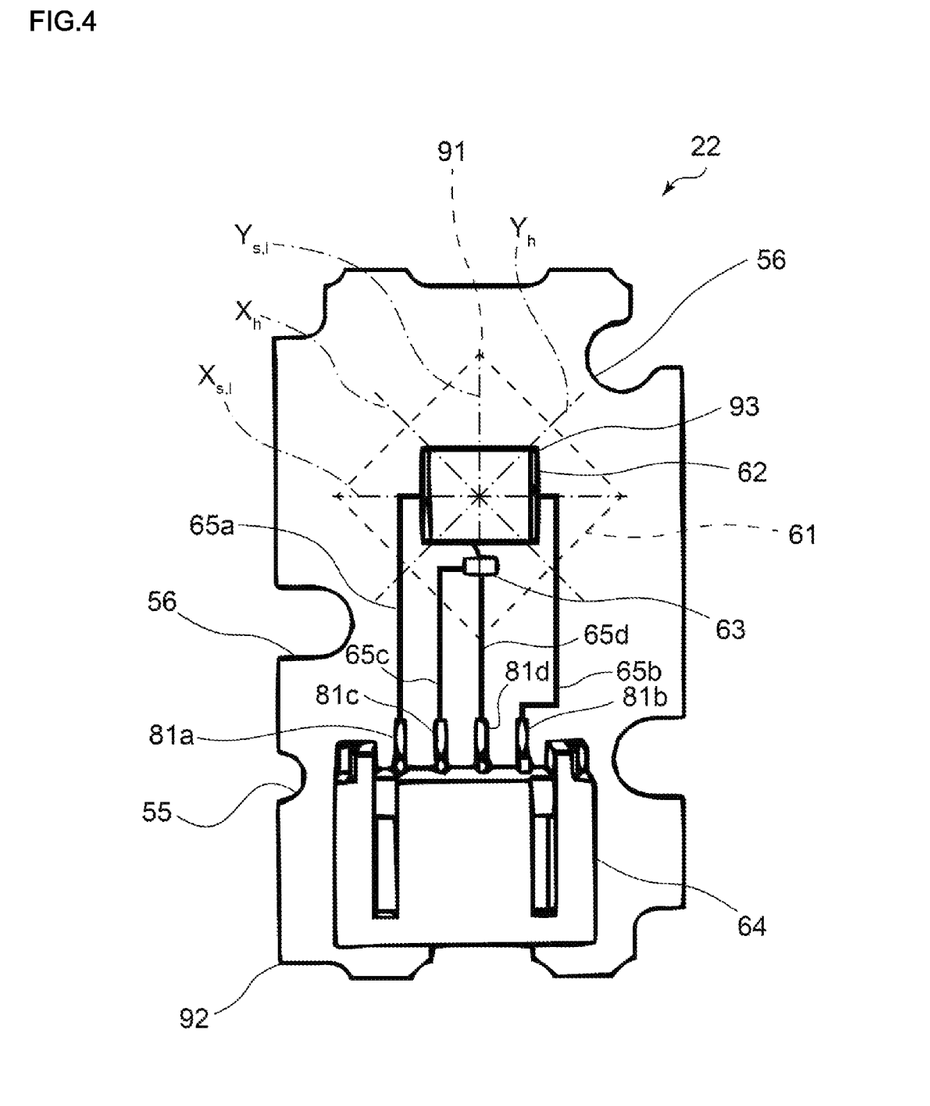
FIG. 4 is a configuration diagram of an LED substrate of the projection type display device.

FIG. 4 is a configuration diagram of the LED substrate 22 of the display device 10.

The LED substrate (circuit substrate) 22 is a glass epoxy circuit substrate using for its base member, for example, FR4 (Flame Retardant Type 4). The LED substrate 22 is substantially rectangular (quadrangular) and includes misassembly prevention notches 55 (55a, 55b, and 55c) (substrate-side attachment part) and notches 56 for screwing (56a, 56b, and 56c). The misassembly prevention notches 55 are used when positioned in the housing 21 and are paired with the misassembly prevention protrusions 31a, 31b, and 31c of the housing 21. The notches 56 (56a, 56b, and 56c) for screwing are used when screwed to the housing 21 and paired with screw holes (not illustrated) of the housing 21.

Figure 5:
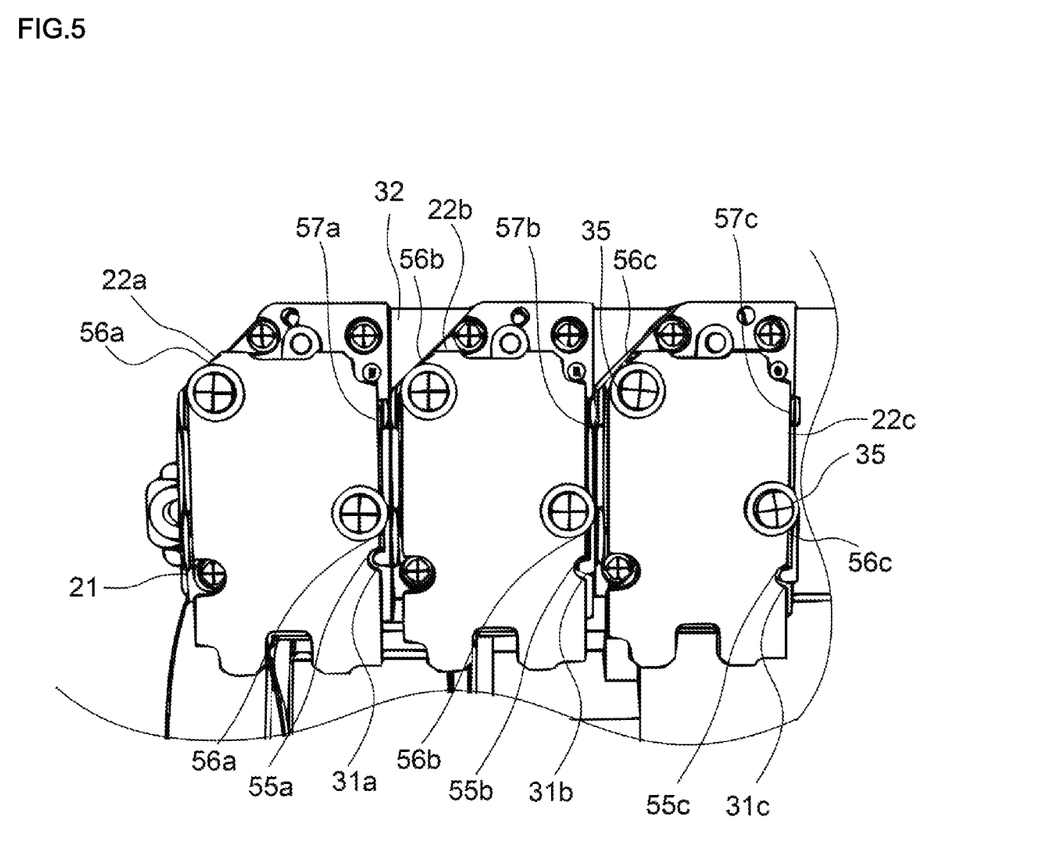
FIG. 5 is an enlarged view for explaining an attachment structure of the LED substrate and a housing.

Here, FIG. 5 is an enlarged view for explaining the attachment structure of the LED substrate 22 and the housing 21.

The LED substrate 22 is fixed to an attachment wall 32 of the housing 21 with a screw 35 after positioning. The misassembly prevention notches 55a, 55b, and 55c of the first to third substrates 22a, 22b, and 22c are provided at different positions on one side 57a, 57b, and 57c of the rectangle, respectively. In addition, the misassembly prevention protrusions 31a, 31b, and 31c of the housing 21 are provided at different positions corresponding to the positions of these misassembly prevention notches 55a, 55b, and 55c. That is, a pair of the protrusion 31a and notch 55a, a pair of the protrusion 31b and notch 55b, and a pair of the protrusion 31c and notch 55c are provided at different positions from one another. This prevents the LED substrate 22 from fitting if mounted in a wrong position. Therefore, it is possible to prevent the LED substrate 22 from being erroneously attached to the housing 21.

As illustrated in FIG. 4, the LED substrate 22 includes a heat dissipation plate 61, a light source 62, a thermistor 63, and a connector 64.

Figure 6:
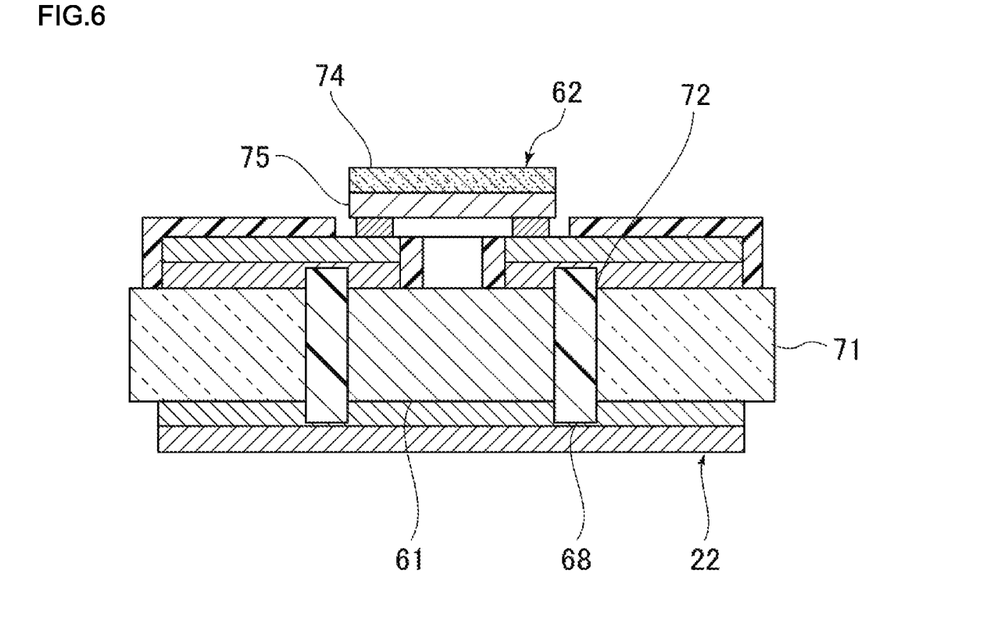
FIG. 6 is a cross-sectional view along the thickness direction of the LED substrate.

The heat dissipation plate 61 is substantially square (quadrangular) in a plan view and radiates heat of the light source 62. The heat dissipation plate 61 includes a material having good heat conductivity and insulating properties, for example, aluminum nitride. The heat dissipation plate 61 preferably includes a material same as the material of the base member 71 of the light source 62 in view of thermal properties and the temperature detection by the thermistor 63. Here, FIG. 6 is a cross-sectional view along the thickness direction of the LED substrate 22. The heat dissipation plate 61 is fixed to an opening 72 provided in the base member 71 with an adhesive 68. The adhesive 68 is, for example, an epoxy resin. That is, the heat dissipation plate 61 is embedded in the inner layer of the LED substrate 22.

The light source 62 is substantially quadrangular in a plan view and is provided on the heat dissipation plate 61. The light source 62 is an SMD (Surface Mount Device) type LED (Light Emitting Diode), and includes an LED element 74 and a base plate 75. The base member 75 includes, for example, aluminum nitride (AlN).

The thermistor 63 is provided on the heat dissipation plate 61, and detects a temperature. Information on the temperature of the heat dissipation plate 61 detected by the thermistor 63 is output to the main control substrate 27 as the temperature of the light source 62, and is used for controlling the light source 62 and the like.

The connector 64 includes terminals 81a to 81d. The connector 64 connects the LED substrate 22 to a power supply (not illustrated) via a wiring 65a at the terminal 81a, thereby supplying power to the light source 62. The connector 64 connects the light source 62 to the ground (not illustrated) via a wiring 65b at the terminal 81b. The connector 64 connects the thermistor 63 and the power supply (not illustrated) via a wiring 65c at the terminal 81c, thereby supplying power to the thermistor 63. The connector 64 connects the thermistor 63 to the main control substrate 27 via a wiring 65d at the terminal 81d, thereby supplying a signal output from the thermistor 63 to the main control substrate 27. Of the terminals 81a to 81d, the terminals 81a and 81b are arranged outside. Of the terminals 81a to 81d, the terminals 81c and 81d are arranged inside.

Next, the arrangement of each component on the LED substrate 22 will be described.

As illustrated in FIG. 4, the light source 62 is arranged substantially at the center on the heat dissipation plate 61. With this, the heat generated by the light source 62 is radiated to the LED substrate 22 via the heat dissipation plate 61, and the heat radiation performance for heat generated by the light source is enhanced.

In addition, the heat dissipation plate 61 is arranged in such a manner that a corner 91 of the heat dissipation plate 61 is rotated by approximately 45 degrees with respect to a corner 92 of the LED substrate 22. In addition, the heat dissipation plate 61 is arranged in such a manner that the corner 91 of the heat dissipation plate 61 is rotated by approximately 45 degrees with respect to a corner 93 of the light source 62. That is, if the heat dissipation plate 61, LED substrate 22, and light source 62 have a quadrangular shape having two orthogonal sides, orthogonal axes Xh and Yh that define the directions of the two orthogonal sides of the heat dissipation plate 61 are rotated by approximately 45 degrees with respect to orthogonal axes Xs,l and Ys,l that define the directions of the two orthogonal sides of the LED substrate 22 and the light source 62.

This allows a wider margin to be formed on the heat dissipation plate 61 when the light source 62 is arranged at the center of the heat dissipation plate 61 compared to when each of the corners 91 and 93 of the heat dissipation plate 61 and the light source 62 are not rotated and arranged, and therefore the thermistor 63 can be arranged in this margin. In addition, since the light source 62 and the thermistor 63 can be arranged on the heat dissipation plate 61, the temperature of the light source 62 can be accurately detected by the thermistor 63.

In addition, the thermistor 63 is arranged on a straight line connecting the connector 64 and the light source 62. With this, the wirings 65a to 65d can be short and simply arranged in combination with the arrangement of the terminals 81a to 81d. Moreover, in this manner, the arrangement of the wirings 65a to 65d can increase the heat radiating area of the heat dissipation plate 61 and is also preferable from the viewpoint of heat radiation.

In addition, the heat dissipation plate 61 and the base member 75 are made of the same material. If the heat dissipation plate 61 and base member 75 are not made of the same material, when they expand and contract by a temperature change due to a difference in thermal expansion coefficients, a load may be applied between the heat dissipation plate 61 and the base member 75, and a solder joint connecting the light source 62 and the wirings 65a and 65b may be broken, resulting in poor connection. Therefore, the use of the same material for the heat dissipation plate 61 and the base member 75 can prevent poor connection due to soldering crack.

While several embodiments of the present disclosure have been described, these embodiments are provided by way of example only and are not intended to limit the scope of the invention. These new embodiments can be implemented in various other forms, and various omissions, replacements, and changes can be made without departing from the gist of the invention. These embodiments and modifications thereof are included in the scope and gist of the invention, and are also included in the invention described in the claims and the equivalents thereof.

For example, the heat dissipation plate 61 and the base member 75 are not limited to aluminum nitride (AlN). The base member 75 may be selected from aluminum (Al), gallium nitride (GaN), or the like. It is preferable that the difference between the thermal expansion coefficients of the heat dissipation plate 61 and the base member 75 is less than 1 ($10^{-6}$/K), and it is preferable that the heat dissipation plate 61 and the base member 75 are made of the same material having no difference in the thermal expansion coefficients as an optimal material.

For example, the amount of rotation of the corner 91 of the heat dissipation plate 61 with respect to the corners 92 and 93 of the LED substrate 22 and the light source 62 is not limited to 45 degrees. In addition, the heat dissipation plate 61, LED substrate 22, and light source 62 are not limited to have a quadrangular shape having two orthogonal sides, and may have a rhombic shape having two sides that are not orthogonal.

In addition, the arrangement of the terminals 81a to 81d and the wirings 65a to 65d is not limited to this. For example, by arranging the wiring 65a and wiring 65b side by side, there is an advantage that the influence of electromagnetic waves can be canceled out.

DESCRIPTION OF REFERENCE NUMERALS 1 head-up display (HUD)
2 front glass
3 eyebox
4 viewpoint
10 projection type display device (display device)
13 first plane mirror
14 second plane mirror
15 screen
16 first concave mirror
17 second concave mirror
18 case
18a opening
19 translucent cover
21 housing
22 LED substrate (circuit substrate)
22a first substrate
22b second substrate
22c third substrate
23 optical member
24 light modulation element
26 light modulation element control substrate
27 main control substrate
31a, 31b, 31c misassembly prevention protrusions
32 attachment wall
41 mirror
42, 43 dichroic mirrors
44 reflecting mirror
45 convex lens
46 prism
47 projection lens
51, 52 wirings
55, 55a, 55b, 55c misassembly prevention protrusions
61 heat dissipation plate
62 light source
62a red light source
62b green light source
62c blue light source
63 thermistor 64 connector
65*a*, 65*b*, 65*c*, 65*d* wirings
68 adhesive
71, 75 base members
72 opening
74 LED element
81*a*, 81*b*, 81*c*, 81*d* terminals
91, 92, 93 corners

The invention claimed is:

1. A head-up display for irradiating display light of a display image projected by a display device to a transmission reflection part on a vehicle to allow a viewer to visually recognize a virtual image of the display image,
    wherein the display device includes a circuit substrate,
    wherein the circuit substrate includes:
        a heat dissipation plate arranged such that the heat dissipation plate is embedded in the circuit substrate; and
        a light source arranged such that the light source overlap the heat dissipation plate in plan view,
    wherein the heat dissipation plate includes a square heat dissipation plate in plan view,
    wherein the light source includes a rectangular light source in plan view,
    wherein, in plan view, the square heat dissipation plate is arranged in such a manner that a corner of the square heat dissipation plate is rotated with respect to a corner of the light source,
    wherein the square heat dissipation plate includes a first pair of diagonally opposite corners through which a first hypothetical straight line runs,
    wherein the rectangular light source includes a second pair of diagonally opposite corners through which a second hypothetical straight line runs, and
    wherein the corner of the heat dissipation plate is rotated with respect to the corner of the light source such that an angle between the first hypothetical straight line and the second hypothetical straight line is 45 degrees.

2. The head-up display according to claim 1,
    wherein the circuit substrate has a quadrangular shape, and
    wherein the heat dissipation plate is arranged in such a manner that the corner of the heat dissipation plate is rotated by 45 degrees with respect to a corner of the circuit substrate.

3. The head-up display according to claim 1, further comprising a thermistor configured to detect a temperature of the light source,
    wherein an area of the heat dissipation plate is larger than an area of the light source in plan view such that a margin is formed between a perimeter of the heat dissipation plate and a perimeter of the light source, and
    wherein the thermistor is provided on the heat dissipation plate such that the thermistor is provided in the margin.

4. The head-up display according to claim 1,
    wherein the light source includes a first base member, and
    wherein the heat dissipation plate includes a material same as a material of the first base member.

5. The head-up display according to claim 1,
    wherein the display device includes 1) a plurality of the circuit substrates on which different light sources are mounted and 2) a housing to which the plurality of the circuit substrates are attached,
    wherein the housing includes a plurality of housing-side attachment parts for attaching the plurality of the circuit substrates, the plurality of the circuit substrates include a plurality of substrate-side attachment parts that are paired with the plurality of housing-side attachment parts, respectively, and
    wherein pairs of the plurality of housing-side attachment parts and the plurality of substrate-side attachment parts are provided at different positions, respectively.

6. The head-up display according to claim 3, further comprising a connector configured to connect 1) the circuit substrate to a power supply and 2) the thermistor to a main control substrate of the display device,
    wherein the thermistor is provided on a hypothetical straight line connecting the connector and the light source.

7. The head-up display according to claim 1,
    wherein the circuit substrate includes a second base member,
    wherein the second base member includes an opening, and
    wherein the heat dissipation plate is disposed in the opening of the second base member such that the heat dissipation plate is embedded in the second base member of the circuit substrate.

* * * * *